(12) United States Patent
Tyson et al.

(10) Patent No.: US 9,355,564 B1
(45) Date of Patent: May 31, 2016

(54) POSITION DETERMINATION SYSTEMS AND METHODS FOR A PLURALITY OF AIRCRAFT

(71) Applicants: Stephen E. Tyson, Marion, IA (US); Rob P. Scott, Hiawatha, IA (US); Marc Ayala, Robins, IA (US)

(72) Inventors: Stephen E. Tyson, Marion, IA (US); Rob P. Scott, Hiawatha, IA (US); Marc Ayala, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 183 days.

(21) Appl. No.: 13/968,300

(22) Filed: Aug. 15, 2013

(51) Int. Cl.
*G08G 5/00* (2006.01)
*G08G 5/04* (2006.01)

(52) U.S. Cl.
CPC .................... *G08G 5/0008* (2013.01)

(58) Field of Classification Search
CPC ..... G08G 5/00; G08G 5/0004; G08G 5/0017; G08G 5/0021; G08G 5/004; G08G 5/0008; G08G 5/0052; G08G 5/0078; G02B 27/017; G02B 2027/0181; G01S 13/9303; G05D 1/104; G06T 2210/36; G06T 10/003
USPC ........... 701/3, 116, 301; 342/36, 46; 340/961; 345/7; 715/855
See application file for complete search history.

(56) References Cited

U.S. PATENT DOCUMENTS

| | | | | |
|---|---|---|---|---|
| 5,521,817 A * | 5/1996 | Burdoin | ............... | G05D 1/0027 244/190 |
| 6,262,679 B1 * | 7/2001 | Tran | .................... | G01S 13/9303 342/29 |
| 6,271,768 B1 * | 8/2001 | Frazier, Jr. | ........... | G08G 5/0008 340/961 |
| 7,272,472 B1 * | 9/2007 | McElreath | ............ | G01S 5/0289 701/3 |
| 2004/0061726 A1 * | 4/2004 | Dunn | ...................... | G06T 17/05 715/855 |
| 2007/0222665 A1 * | 9/2007 | Koeneman | .......... | G01S 13/9303 342/29 |
| 2012/0140070 A1 * | 6/2012 | De Mers | .............. | G02B 27/017 348/144 |

* cited by examiner

*Primary Examiner* — Adam Tissot
(74) *Attorney, Agent, or Firm* — Angel N. Gerdzhikov; Donna P. Suchy; Daniel M. Barbieri

(57) ABSTRACT

Systems and methods for use in navigating aircraft are provided. A method includes transmitting messages from a plurality of aircraft within time slots of a data transmission using a data link radio of each of the aircraft. The time slots of the data transmission are divided by time. The master aircraft transmits a message within a first time slot. Each message includes position data, time data, aircraft orientation data, and intended flight path data for the aircraft transmitting the message. The method further includes, for each of the plurality of aircraft, receiving a plurality of received messages transmitted by the other aircraft within the data transmission, and generating a representation of an environment around the aircraft based on the data within the received messages. The representation includes a current position and an intended path for one or more of the other aircraft.

31 Claims, 8 Drawing Sheets

POSITION DETERMINATION SYSTEMS AND METHODS FOR A PLURALITY OF AIRCRAFT

BACKGROUND

The present disclosure relates generally to the field of position determination for vehicles. More particularly, the present disclosure relates to systems and methods that allow a vehicle to determine a relative position of one or more other vehicles.

A vehicle, such as an aircraft, may have a need to be aware of the presence of other vehicles in the vicinity of the vehicle. For example, helicopters operating in degraded visual environments may be at risk from other helicopters operating in close proximity. Similarly, an aircraft (e.g., a fixed-wing aircraft) flying in close formation with other aircraft may be in danger of breaking the formation or even colliding with the other aircraft without knowledge of the position of the other aircraft. There is a need for systems and methods that provide a vehicle with information about the relative positioning and/or movements of other vehicles in the vicinity of the vehicle and/or in which an operator of the vehicle may have an interest. Further, there is a need for such information to be shared between vehicles in an efficient manner that does not require specialized hardware.

SUMMARY

One embodiment of the disclosure relates to a method for use in navigating a plurality of aircraft. The method includes identifying one of the plurality of aircraft as a master aircraft. The method further includes transmitting a plurality of messages from the plurality of aircraft within a plurality of time slots of a data transmission using a data link radio of each of the plurality of aircraft. The time slots of the data transmission are divided by time such that each of the plurality of aircraft transmits a message within a separate time slot of the data transmission. The master aircraft transmits a message within a first time slot of the plurality of time slots. Each message includes position data, time data, aircraft orientation data, and intended flight path data for the aircraft transmitting the message. The method further includes, for each of the plurality of aircraft, receiving a plurality of received messages transmitted by the other aircraft of the plurality of aircraft within the data transmission, and generating a representation of an environment around the aircraft based on the position data, time data, aircraft orientation data, and intended flight path data within the received messages. The representation includes a current position and an intended path for one or more of the other aircraft.

Another embodiment relates to a system for use in navigating an aircraft that includes a data link radio and an electronic processor configured to transmit a message within one of a plurality of time slots of a data transmission using the data link radio. The aircraft is one of a plurality of aircraft. Other aircraft of the plurality of aircraft are configured to transmit messages in other time slots of the plurality of time slots of the data transmission. The time slots of the data transmission are divided by time such that each of the plurality of aircraft transmits a message within a separate time slot of the data transmission. A master aircraft of the plurality of aircraft transmits a message within a first time slot of the plurality of time slots. Each message includes position data, time data, aircraft orientation data, and intended flight path data for the aircraft transmitting the message. The electronic processor is further configured to receive a plurality of received messages transmitted by the other aircraft of the plurality of aircraft within the data transmission, and to generate a representation of an environment around the aircraft based on the position data, time data, aircraft orientation data, and intended flight path data within the received messages. The representation includes a current position and an intended path for one or more of the other aircraft.

Another embodiment relates to one or more computer-readable storage media having instructions stored thereon. The instructions are executable by one or more processors of an aircraft to transmit a message within one of a plurality of time slots of a data transmission using a data link radio. The aircraft is one of a plurality of aircraft. Other aircraft of the plurality of aircraft are configured to transmit messages in other time slots of the plurality of time slots of the data transmission. The time slots of the data transmission are divided by time such that each of the plurality of aircraft transmits a message within a separate time slot of the data transmission. A master aircraft of the plurality of aircraft transmits a message within a first time slot of the plurality of time slots. Each message includes position data, time data, aircraft orientation data, and intended flight path data for the aircraft transmitting the message. The instructions are further executable to receive a plurality of received messages transmitted by the other aircraft of the plurality of aircraft within the data transmission, and to generate a representation of an environment around the aircraft based on the position data, time data, aircraft orientation data, and intended flight path data within the received messages. The representation includes a current position and an intended path for one or more of the other aircraft.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
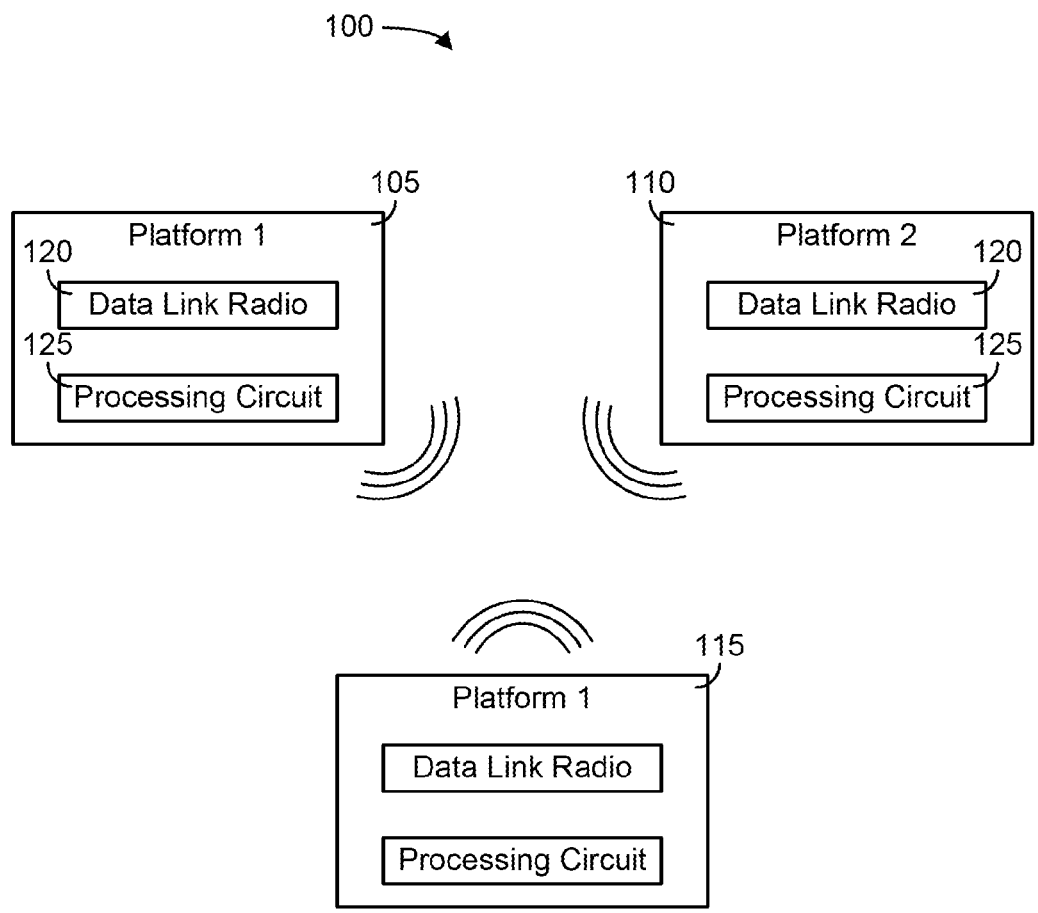
FIG. 1 is a block diagram of a system for sharing information between platforms (e.g., vehicles) for use in navigating the platforms according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods that may be used to assist in navigating one or more platforms (e.g., vehicles) are provided according to exemplary embodiments. It is often useful for vehicles to have an awareness of the location, orientation, and/or intended movement of other vehicles in the vicinity of the vehicle or with which the vehicle is connected (e.g., for performing a particular task, such as firefighting or law enforcement). For example, when a helicopter is operated in a degraded visual environment (e.g., due to sand, dust, snow, rain, darkness, etc.), a threat to the helicopter is other helicopters operating in close proximity. This threat may increase when landing and/or taking off, when other hazards (e.g., ground-based hazards) may also be present. Helicopters flying too closely to one another have resulted in several fatal accidents. The helicopters need not physically collide for such an accident to occur; just coming to close to one another can disturb lift forces enough to cause a catastrophe.

In another example, several aircraft flying proximate to one another may wish to stay in a particular formation with respect to one another. In limited-visibility weather conditions (e.g., Instrument Meteorological Conditions (IMC)), a method of "visualizing" what other aircraft proximate to the aircraft are doing or intend to do may help the aircraft stay in its designated position within the formation. Such visualization of other nearby aircraft may also be useful during a refueling operation.

The systems and methods described herein, according to various exemplary embodiments, are configured to provide a representation of other platforms (e.g., aircraft or other manned or unmanned vehicles) near a platform and/or other platforms of interest (e.g., other platforms cooperating with the platform to complete a task, such as firefighting or law enforcement). To generate the representation, one or more of the following elements may be used: (1) the platform's own position and an accurate relative position of other platforms in close proximity; (2) the orientation of the other proximate platforms (e.g., to provide early warning of departures from normal formations); (3) an indication of intent of the other platforms, such as a velocity vector or a current flight path vector of the aircraft; (4) a time tag identifying a time associated with the above elements; and/or (5) a data link supporting a data transmission (e.g., waveform) that meets the bandwidth, integrity, frequency spectrum, and/or latency requirements to provide the information for particular applications. Further, some exemplary embodiments may be configured to utilize an affordable data link and/or a data link present on existing platforms to avoid the time and expense associated with upgrading the platform data links.

Exemplary systems and methods of the present disclosure utilize a data transmission (e.g., waveform) having a plurality of time slots, wherein different platforms can transmit messages within the different time slots providing position, orientation, intended movement path, time, and/or other information. The messages may be extracted from the data transmission by a processing circuit of a platform, and the information embedded in the messages may be used to generate a representation (e.g., a visual representation) of the other nearby platforms. The representation may provide an indication, for example, of a position, orientation, and intended movement path of the nearby platforms. In some embodiments, the representation may provide further information about other hazards (e.g., terrain and/or weather hazards) near the platform. In some embodiments, systems configured to generate the data transmitted in the messages may already be integrated within the platforms. For example, absolute position, orientation, and current velocity vectors may already be provided by an Embedded Global Positioning System/Inertial Navigation System (EGI) on board aircraft and/or other types of platforms. In some embodiments, GPS may synchronize system clocks to the same reference time for parameter time tagging, or time tagging may be provided by an on board clock that is trained to a time standard (e.g., UTC), such as via GPS when it is available, to minimize dependence on GPS. Many aircraft also have navigation, flight control, and/or display processing systems already on board that can provide a flight path marker or other information relating to immediate intent and/or platform energy state.

The representation may be configured for use with one or more of a variety of applications. For example, the representation may provide a pilot of a rotary-wing aircraft a visualization of other rotary-wing aircraft near the pilot's aircraft, and the pilot may use the representation to ensure that the pilot's aircraft does not travel dangerously close to the other aircraft. In another implementation, the representation may provide a pilot of an aircraft with a visualization of other aircraft flying in a particular formation with the aircraft, and the pilot may use the representation to keep the pilot's aircraft within a designated position within the formation. In another implementation, the representation may provide a pilot of an aircraft with a visualization of other aircraft involved in a refueling operation of one of the aircraft, and the pilot may use the representation to keep the pilot's aircraft in an appropriate position to conduct the refueling operation. In other implementations, platforms (e.g., aircraft, ground vehicles, water-based vehicles, etc.) involved in performing a common task (e.g., firefighting, law enforcement, military, national security, coast guard, etc.) may utilize the data transmission to communicate information between the platforms and coordinate the platforms in completing the task.

It should be noted that the term aircraft, as utilized herein, may include any manned or unmanned object capable of flight. Examples of aircraft may include, but are not limited to, fixed-wing aerial vehicles (e.g., propeller-powered or jet-powered), rotary-wing aerial vehicles (e.g., helicopters), manned aircraft, unmanned aircraft (e.g., unmanned aerial vehicles, or AUVs), etc. Additionally, ground-based vehicles and/or water-based vehicles, as utilized herein, may refer to any type of vehicles (e.g., manned or unmanned) or other objects capable of traveling on ground terrain and/or water, respectively.

Referring now to FIG. 1, a block diagram of system 100 for sharing information between platforms (e.g., vehicles) for use in navigating the platforms is shown according to an exemplary embodiment. System 100 includes a data link radio 120 and a processing circuit 125 coupled to each of two or more platforms. The illustrated embodiment includes three platforms 105, 110, and 115, but in other embodiments, any number of platforms may utilize system 100 to communicate with one another. Data link radio 120 may be a bi-directional data link radio configured to both transmit and receive communications with other data link radios. One such data link radio that may be utilized is the AN/ARC-210 Generation 5 radio manufactured by Rockwell Collins, Inc. Platforms 105, 110, and 115 may be configured to transmit position, orientation, intended travel path, and/or other information to each other using data link radios 120. Processing circuits 125 may be configured to receive the transmitted information and generate a representation (e.g., a visual representation) of the other platforms for use in navigating the platforms.

Figure 2:
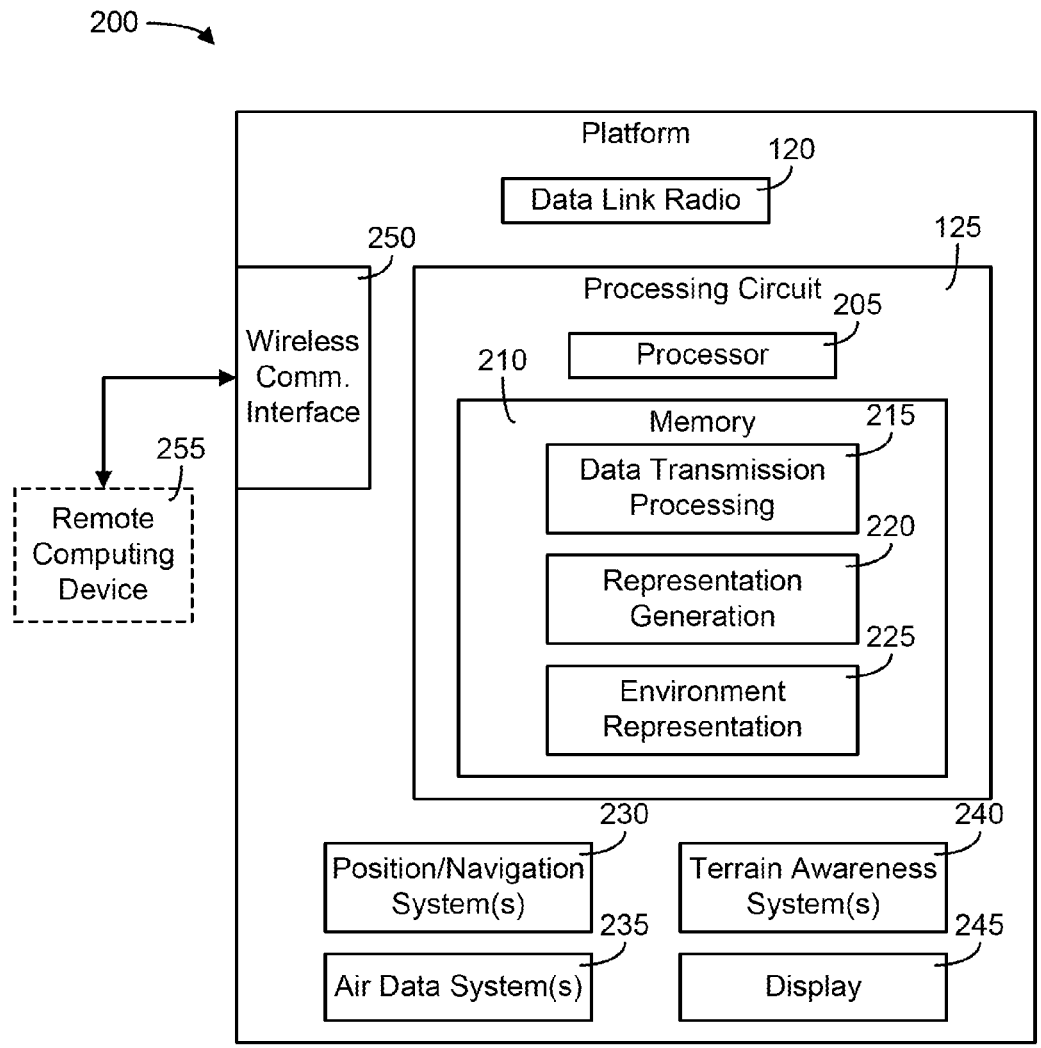
FIG. 2 is a more detailed block diagram of an individual platform according to an exemplary embodiment.

FIG. 2 illustrates a block diagram of an illustrative platform 200 according to an exemplary embodiment. Platform 200 may be an air-based platform, such as a fixed-wing or rotary-wing aircraft. In some exemplary embodiments, other types of platforms (e.g., water and/or land-based platforms, such as ships, trucks, buses, trains, etc.) may include at least some of the same or similar components to those shown in FIG. 2. In some embodiments, platforms 105, 110, and/or 115 shown in FIG. 1 may include the same or similar components to those of platform 200.

Platform 200 includes a data link radio 120 and a processing circuit 125. Processing circuit 125 includes at least one processor 205, which may be any type of general purpose or special purpose processor (e.g., FPGA, CPLD, ASIC, etc.), and at least one memory 210, which may be any type of computer or machine-readable storage medium (e.g., ROM, RAM, hard disk, flash memory, etc.). Processing circuit 125 may be paired with or a component of data link radio 120 or a separate processing circuit. In some embodiments, processing circuit 125 may be a data link processor (DLP) connected to data link radio 120, such as via a networking interface (e.g., Ethernet).

Memory 210 may include one or more modules including instructions that may be executed by processor 205 to perform various processing functions for platform 200. For example, memory 210 may include a data transmission processing module 215 configured to process messages for transmission within a data transmission by data link radio 120 and/or to retrieve messages transmitted by other platforms (e.g., other nearby platforms) within a data transmission received by data link radio 120. In some embodiments, a representation generation module 220 may utilize information retrieved by data transmission processing module 215 within messages received from other platforms and use the information to generate representations of an environment around platform 200, including a representation of the other platforms. The representation may provide an indication of the current position, orientation, intended movement/flight path, and/or other information for the other platforms. A pilot of platform 200 may utilize this information to navigate platform 200. The representation may be stored as an environment representation 225 within memory 210.

Figure 3:
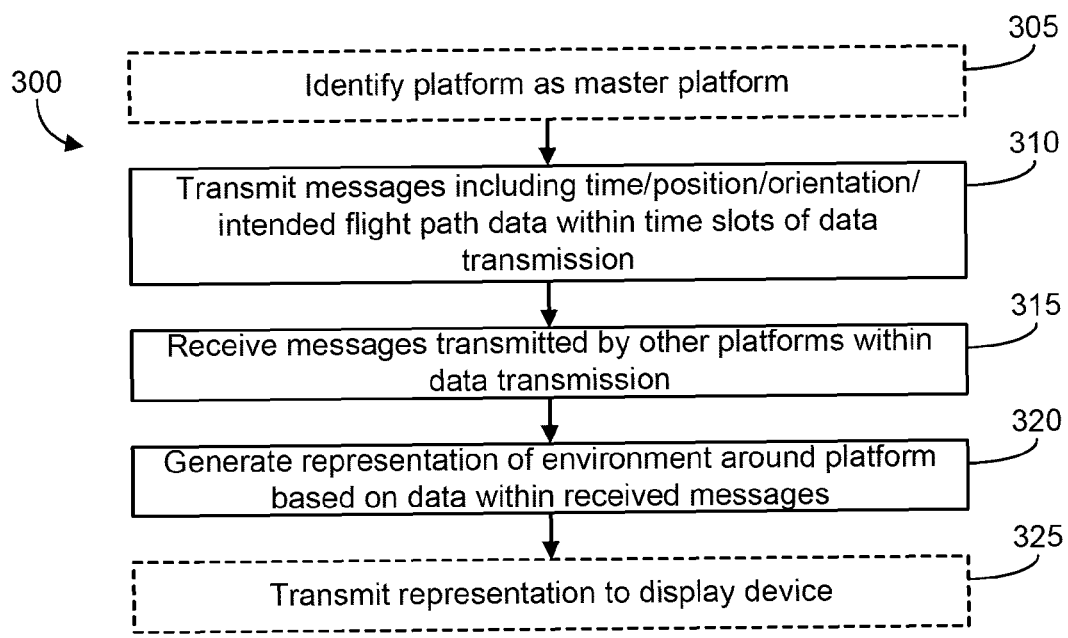
FIG. 3 is a flow diagram of a process for generating a representation of an environment around a platform that may be used in navigating the platform according to an exemplary embodiment.

FIG. 3 illustrates a flow diagram of a process 300 for generating the representation of the environment around platform 200 according to an exemplary embodiment. Referring now to both FIGS. 2 and 3, in some embodiments, platform 200 or another platform may be identified as a master platform (305). In some embodiments, the master platform may be configured to coordinate communications between platforms, as described in further detail below.

Platform 200 and other platforms (e.g., platforms proximate to platform 200 and/or within the same transmission network) may transmit messages within a data transmission using data link radios of the platforms (310). The data transmission may have a particular frame rate or duration, and the frame may be divided into slots by time (e.g., via time domain multiple access, or TDMA), such that each platform may be given one or more time slots in which to transmit a message. The time slots may be equal in length or may be different for different platforms. In some embodiments, the platforms may be assigned time slots within the data transmission frame by the master platform. The master platform may transmit the first message within the first time slot to resynchronize all of the platforms. The messages may be formatted and/or otherwise processed for transmission within the data transmission using processing electronics (e.g., processing circuit 125) of the platforms.

The messages transmitted within the data transmission may include one or more of a variety of types of information about the platforms. The messages may include a position of the platform, such as an absolute position (e.g., GPS coordinates, latitude and longitude, etc.) and/or a relative position (e.g., a bearing and distance with respect to another platform). The messages may include an orientation of the platform, such as a heading or other indication of orientation. The messages may include information relating to an immediate intended movement (e.g., providing an indication of where the platform is in the process of moving or is likely to move in the near future). In some embodiments, the intended movement data may include, for example, a velocity vector, a flight path marker/vector, an energy state, and/or another type of data indicative of the current and/or likely immediate future movement of the aircraft. The aircraft acceleration/deceleration of airspeed with respect to desired position and throttle setting required to achieve this position is an example energy state. Some or all of the data elements may be tagged with an associated time stamp indicating the time at which the data was collected (e.g., UTC time). In some embodiments, platform 200 may be configured to obtain some or all of this data from one or more position/navigation systems 230, such as an onboard Embedded Global Positioning System/Inertial Navigation System (EGI). In some embodiments, the time data may be obtained from GPS data or from a separate clock circuit synchronized (e.g., periodically) with the GPS system.

In some embodiments, the messages may also include one or more other types of data, such as hazard data relating to nearby hazards (e.g., terrain and/or weather hazards) collected by one of the platforms. For example, in some embodiments, platform 200 may be equipped with a terrain awareness system 240, such as a radar (e.g., millimeter-wave, or MMW, radar system) or LIDAR system, that may be configured to collect (e.g., directly sense) data regarding one or more terrain features proximate to platform 200 that may pose a risk to platform 200. Terrain awareness system 240 may be configured to detect some information relating to the presence of other platforms near platform 200, such as an approximate relative position of the other platforms, but may not be configured to provide a 360 degree spherical coverage around platform 200. In some embodiments, platform 200 may be equipped with a weather hazard detection system (e.g., a weather radar system) configured to detect weather hazards (e.g., inclement weather, such as ice, sleet, rain, lightning, turbulence, etc.) in the vicinity of platform 200. In some embodiments, wind, air speed, and/or other air data may be collected by an air data system 235 (e.g., an air data computer). In some embodiments, platform 200 may be equipped with other types of direct sensing systems, such as a radio altimeter system, thermal imaging system, low light imaging system, etc. This terrain data, weather data, air data, and/or other data collected using other systems of platform 200 may be transmitted within the one or more messages transmitted by platform 200 within the data transmission.

Platform 200 may be configured to receive messages transmitted by other platforms within the data transmission using data link radio 120 and extract data from the messages within the data transmission using processing circuit 125 (315). In some embodiments, the data may be encoded and/or encrypted upon transmission by processing circuitry of the transmitting platform, and processing circuit 125 may be configured to decode and/or decrypt the data to retrieve the data from the data transmission.

The retrieved data may be used to generate a representation (e.g., a visual representation) of an environment around platform 200 (320). The representation may include a synthetic view of other platforms in close proximity to the location of platform 200 and/or other threats that may be nearby and may limit choices for navigation paths and/or landing zones. The representation may include an indication of the current position of the other platforms, a current orientation of the other platforms, and/or an intended movement path (e.g., represented by an arrow or other indicator) of the other platforms. In some embodiments, the representation may include data other than data relating to the other platforms, such as terrain and/or weather hazard data and/or air data collected by platform 200 and/or the other platforms.

In some embodiments, the representation may be transmitted to a display device 245 for display to a user, such as a pilot (325). For example, the representation may be transmitted to a helmet mounted display (HMD), a heads up display (HUD), a heads down display (HDD), or another type of display device. In some embodiments, a synthetic view generated based on the representation on a HMD may be configured to change based on the orientation of the user's head (e.g., based on gyroscopes, accelerometers, and/or other orientation sensing devices of the HMD). In some embodiments, a synthetic view displayed on a HUD or HDD may be fixed relative to the orientation of platform 200 or fixed with respect to a particular point external to platform 200 (e.g., to provide an "exo" or "gods eye" view). In some embodiments, the visual representation shown on display device 245 may be a two-dimensional or a three-dimensional representation of the other platforms around platform 200.

In some embodiments, the representation may be transmitted to a remote computing device 255 via a wireless communication interface 250 (e.g., a satellite link or other long-range wireless transmission link). Remote computing device 255 may be configured to display a visual representation of the platforms near platform 200 on a display device. In some embodiments, an operator of remote computing device 255 may use remote computing device 255 to adjust parameters of platform 200 and/or control navigation of platform 200 remotely (e.g., when platform 200 is an unmanned aircraft or other vehicle).

In some embodiments, the data contained within the data transmission and/or the representation may be used to generate data for use in navigating platform 200 (e.g., if platform 200 is a partially or fully autonomous aircraft capable of flying without a pilot). For example, platform 200 may navigate at least in part based on data stored in a three-dimensional database stored in a memory of platform 200. The three-dimensional database may store data regarding hazards, and platform 200 may use the data to avoid hazards in an autopilot mode (e.g., on approach during a landing operation). In some embodiments, the data from the data transmission and/or representation may be used to update the information in the three-dimensional database to include up-to-date information on the location, orientation, intended movement, etc. of nearby platforms, and platform 200 may utilize the updated information to avoid the other platforms and/or maintain within a formation position with respect to the other platforms in the autopilot mode.

In some embodiments, information may be shared between platforms using a data transmission method configured to provide efficient transfer of information over a time-divided data transmission (e.g., the Joint Precision Approach and Landing System (JPALS) waveform or a derivation thereof). For example, JPALS navigation components and the JPALS data link were developed for landing single aircraft on moving ships, e.g., by hitting a spot between two wires on the deck of an aircraft carrier.

Such an exemplary data transmission method may use a UHF bidirectional data link/waveform to create a network that has a ship segment (SS) and multiple (e.g., up to 54) air segments (AS). The network may use existing radios, such as the AN/ARC-210 Generation 5 manufactured by Rockwell Collins, Inc., for the air segments (AS) to communicate with an aircraft carrier (SS). The radios may be connected to data link processors (DLPs) with Ethernet connections. The AS DLP may receive GPS and heading/orientation/acceleration information from an onboard EGI that also allows for short (e.g., seconds to a few minutes) disruptions in GPS signals to be ignored. The AS DLP also may receive air data information (e.g., winds, air speed) from air data computers (ADCs) in the aircraft via the same data bus (e.g., a 1553B bus) that transmits the EGI information.

On the ship, the system is similar, except the ship DLP may use multiple EGIs with additional navigation information accessed over Ethernet through additional data systems. The ship system otherwise may operate in a similar manner as the air system.

In some embodiments, the data transmission may be divided into slots by time (e.g., using TDMA) to enable all participants to broadcast at an assigned time. The time may be synchronized to GPS Time of Day (TOD).

The ship (SS) may be the network master and assign slots and other parameters for the network. The SS may send the first message within the first slot in each frame to resynchronize the airborne segments. The SS can also send a wave-off (don't land) command very quickly to an approaching aircraft using the defined network structure. In addition to network definition, ship/deck status, and synchronization messages, the SS may also send ship motion messages that include heave height (e.g., of the intended landing point), heading, roll, vertical acceleration, location of the landing wire, ship trim, and/or wind information.

Each aircraft (AS) in the network may send two types of messages: surveillance (e.g., used from about 60 miles out) and precision surveillance (e.g., used on final approach). Surveillance messages include an aircraft ID, a transponder code, a type of aircraft, latitude/longitude, altitude, ground speed, and estimated positioning errors. Precision surveillance messages include additional information related to airspeed, intended path, touchdown point, and/or any deviations from the intended path.

A similar data transmission method may be used to implement applications other than landing aircraft on an aircraft carrier, such as for communicating information between two aircraft in proximity to one another for use in generating a representation of the air traffic around the aircraft. In some embodiments, one aircraft (e.g., the lead aircraft in a formation) may be designated as a master platform and may take over a function similar to the ship segment (SS). The master aircraft may become the network master and may be the reference point on which other operations are based. In some embodiments, one or more of the ship motion data elements described above may be repurposed for providing the information to be transmitted to the other aircraft. The master aircraft may, in some embodiments, use one of the AS slots to transmit a message providing air and ground speed of the master aircraft.

In some embodiments, the air-to-air communication system may be implemented using the existing DLP and radio on aircraft (e.g., to land on a ship or at an airport). In some implementations, a physical or logical switch may be provided to change modes between using the DLP and radio for communicating with a ship/airport for landing and communicating with another aircraft (e.g., for keeping in a formation, collision avoidance, etc.). In some embodiments, no or minor modifications may be required to the radio software of the following aircraft (AS) to implement the air-to-air communication system. The data transmission system may provide capabilities such as encryption, electronic countermeasure, and/or electronic counter-countermeasure capabilities.

The software in the lead aircraft (modified SS) DLP may be modified to reinterpret ship status and motion data elements as applicable to the lead aircraft and send them out over the radio. For example, the desired touchdown point can be used to indicate which predefined landing point is intended for the lead aircraft. Other parameters/data desired for transmission to the other aircraft may be transmitted into the first slot (SS slot) and/or in other AS slots designated for the lead aircraft. The non-master aircraft may transmit data in their designated AS slots in a similar fashion to the air-ship implementation (e.g., using surveillance and/or precision surveillance messages).

The master aircraft DLP may extract the messages transmitted by the other aircraft within the data transmission and process the data. The master aircraft may generate a three-dimensional virtual ownship body that is correctly placed, oriented, and moved in a virtual space to send to a display processor (e.g., to show exo views for synthetic images). The master aircraft DLP may use the AS surveillance and/or precisions surveillance messages to generate virtual representations of the other aircraft near the master aircraft and/or in a formation with the master aircraft. In some embodiments, the master aircraft may use unused AS messages to transmit information regarding locations of obstacles and/or other threats directly sensed by the aircraft that may not have been previously known to the other aircraft. Open AS slots may also be used to generate virtual representations of other proximate aircraft (e.g., aircraft not part of a formation with the master aircraft but still in the vicinity of the master aircraft).

The non-master (AS) aircraft DLP may interpret the SS messages as belonging to the master aircraft (e.g., flight lead) and may combine them with information from one or more AS messages designated as originating from the master aircraft to generate a virtual representation of the master aircraft and its intended path and/or touchdown point. This information may be provided to one or more display systems for display within synthetic views. In some embodiments, the AS data elements originally used to lateral and vertical deviation and drift rate may instead be used for roll, yaw, and pitch, as those data elements may have the right size and frequency for the roll, yaw, and pitch parameters and are not needed for the air-air implementation. Ownship data may be used to create a virtual representation of the aircraft to show in synthetic views. These views may allow the user to have a perspective (e.g., "God's eye view") outside of the aircraft. The AS messages of other proximate aircraft may be used to generate virtual representations of those aircraft as well.

Use of such a data transmission method may provide some advantages. For example, the data link and navigation elements may have been previously vetted for integrity and latency regarding two moving bodies in close proximity (e.g., an aircraft and an aircraft carrier) in a safety of life application. The data transmission method may also provide relative motion and differential correction information for two moving entities in close proximity. Existing radios may be capable of operating using the data transmission method, avoiding the need to add new radio hardware to aircraft.

In some embodiments, other AS slots may be repurposed to create waypoints for refueling tracks, fire retardant drop points, or other purposes where a point in space and time may be indicated.

In some embodiments, data may be shared across aircrafts using multiple sub-networks, for example, when aircraft are flying in a large formation. This may be permissible in a large formation, as in formation flying or landing, each aircraft is usually only stationkeeping with respect to one or two other aircraft. Separate sub-networks can be used that may be separated by time, frequency, or other types of network isolation methods.

Figure 4:
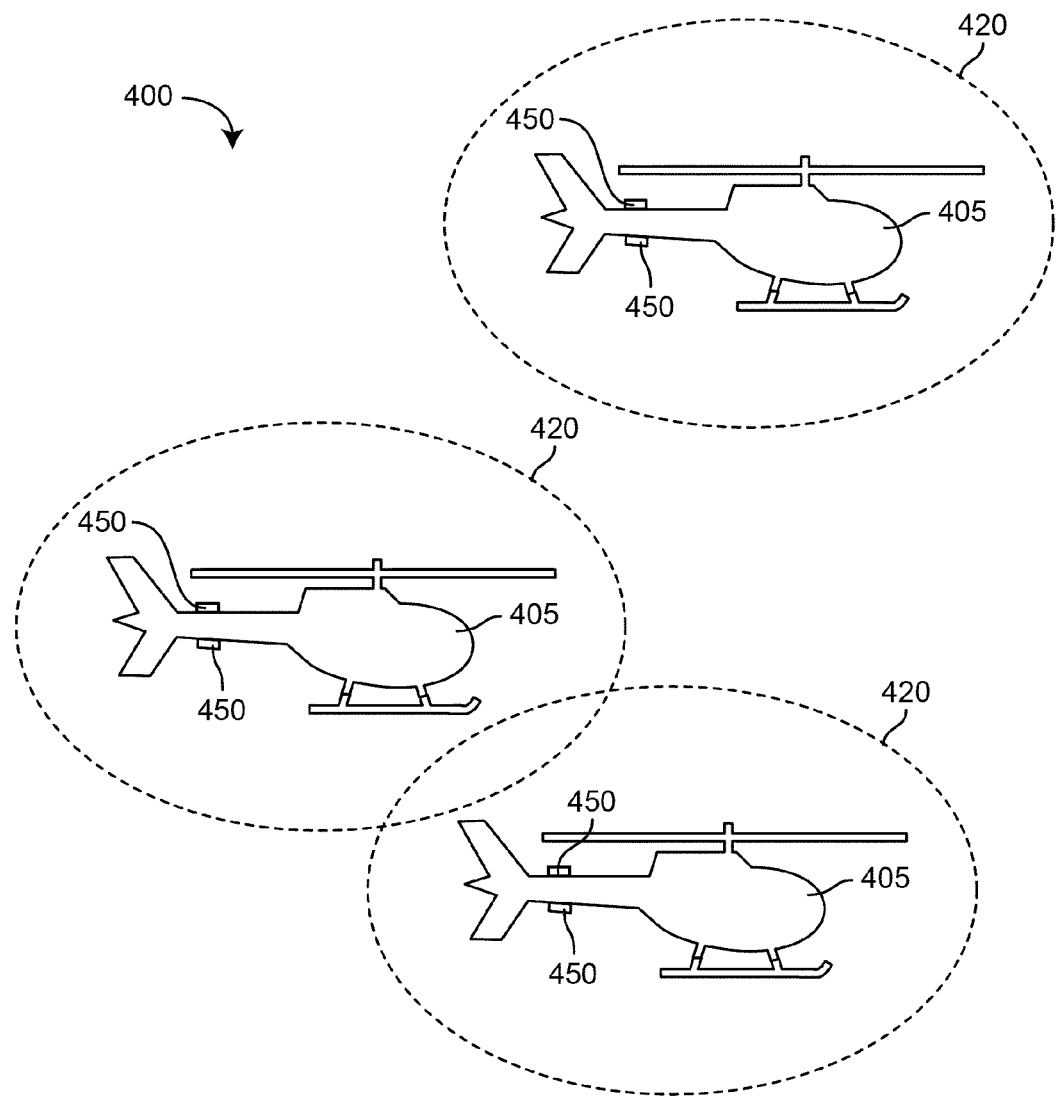
FIG. 4 is an illustration of an implementation in which several rotary-wing aircraft are operated in proximity to one another according to an exemplary embodiment.

FIGS. 4 through 8 illustrate different implementations in which information may be shared among different platforms using the systems and methods described above. Referring specifically to FIG. 4, an illustration of an implementation 400 in which several rotary-wing aircraft are operated in proximity to one another is shown according to an exemplary embodiment. In the illustrated embodiment, three helicopters 405, 410, and 415 are being operated in close proximity to one another. Each of the helicopters may have a safety zone 420 (e.g., a spherical zone) surrounding the helicopter representing a zone which the other helicopters should not enter, or there is a risk that one or both of the helicopters will lose the necessary lift forces to keep it safely in the air. In the illustrated embodiment, the safety zones of helicopters 410 and 415 are intersecting, meaning the helicopters are being operated in potentially dangerously close proximity to one another.

In some embodiments, helicopters 405, 410, and 415 may each be equipped with radios 450 (e.g., data link radio 120 and/or processing circuit 125) configured to communicate position, orientation, time, and intended flight path information among the helicopters. In some embodiments, a first helicopter on the ground may be designated as the master helicopter for relative navigation, as it is possible to have near perfect knowledge of the location of the helicopter when on the ground, and particularly the height of the helicopter with respect to terrain, and the ground helicopter has the least ability to avoid a collision. In some embodiments, the other helicopters may utilize relative navigation data transmitted by the master helicopter to refine their earth centered positions. In some embodiments, each platform may have a GPS antenna steering system on board for GPS signal availability, such as the Digital Integrated GPS Anti-Jam Receiver (DI-GAR) manufactured by Rockwell Collins, Inc.

Each helicopter may retrieve the data relating to the other helicopters from the data transmission and use it to generate a representation of the other helicopters (e.g., position, orientation, and intended movement). The representation may be used by the pilots of the helicopters to operate the helicopters in close proximity to one another while ensuring that the helicopters do not travel dangerously close to one another (e.g., such that the intersect safety zones do not overlap). In some embodiments, the displayed representation may provide an indication of the safety zones associated with the aircraft for which the representation is displayed and/or the other aircraft shown within the representation. In some embodiments, each of the helicopters may utilize existing EGI and/or display equipment to generate part or all of the data transmitted in the data transmission and/or to display the data and/or the representation of the other helicopters.

Figure 5:
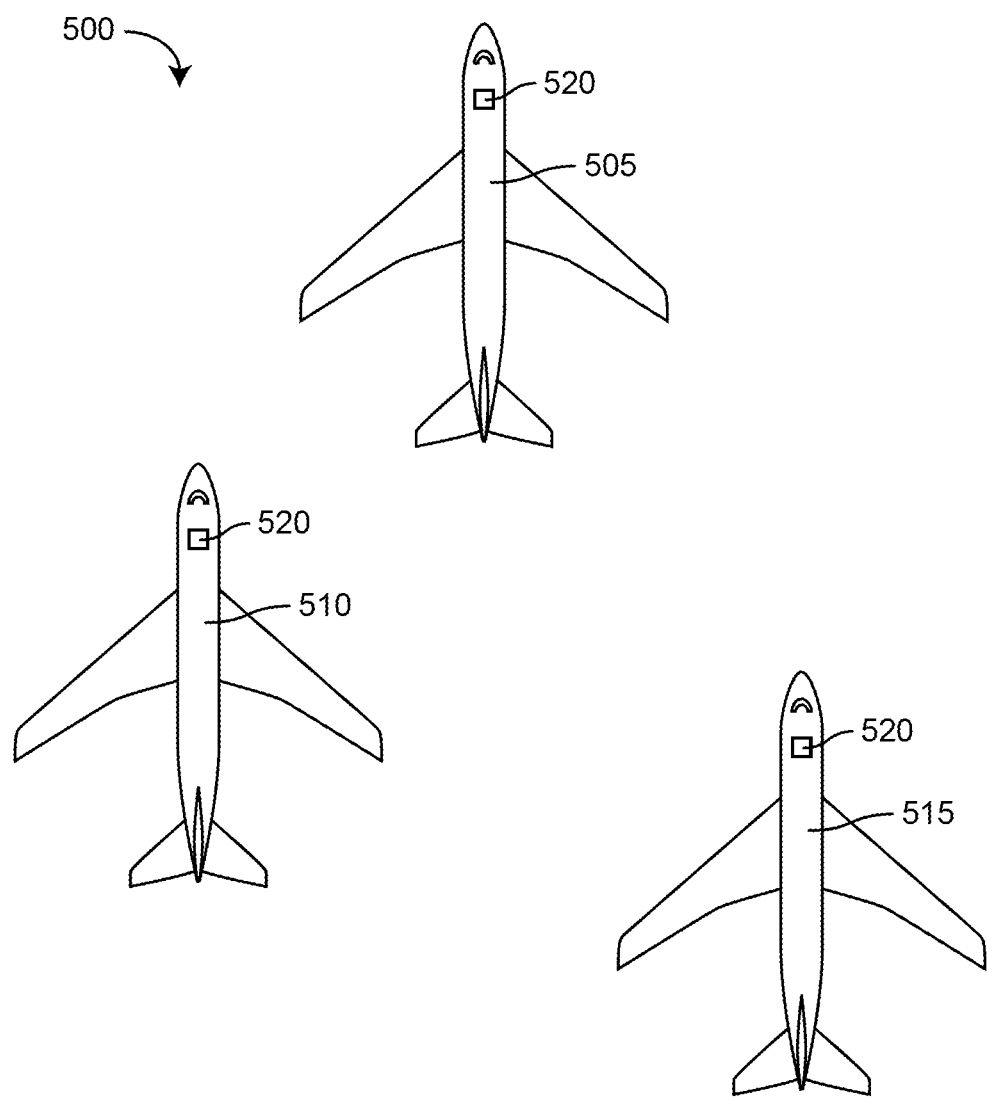
FIG. 5 is an illustration of an implementation in which several fixed-wing aircraft are maintained within a predetermined formation according to an exemplary embodiment.

Referring now to FIG. 5, another implementation 500 is shown in which several aircraft (e.g., fixed-wing aircraft) are flying within a particular formation with respect to other nearby aircraft. U.S. Air Force mobility aircraft operated by Air Mobility Command have a requirement to fly together in formation at distances of several thousand feet. Existing Station Keeping Equipment (SKE) is RF based and faces obsolescence issues. The size and weight (e.g., greater than 100 pounds) of the SKE system often in current use uses a drag inducing antenna costing millions of dollars in fuel efficiency each year.

In some implementations, a radio (e.g., JPALS radio) and GPS system could be used to replace the heavy SKE system and allow for removal of the drag-inducing antenna. A lead aircraft 505 of the formation may be designated as the master aircraft for transmission of the data transmission, and two other aircraft 510 and 515 may be designated as non-master aircraft. Each may be equipped with a radio 520 (e.g., data link radio 120 and/or processing circuit 125) configured to communicate position, orientation, time, and intended flight path information among the aircraft. In some embodiments, the lead aircraft 505 may be designated as the master aircraft while on the ground to provide near perfect knowledge of initial location. The data transmitted through the data transmission may be used to generate a representation of the other aircraft near each aircraft, allowing the pilot to maintain the aircraft in or near a designated position within the predetermined flight formation. The use of a data transmission such as those described herein to replace the SKE may result in up to a ten percent fuel savings. The signal may also be capable of encryption, which may not be capable on some current SKE systems, and the data transmission may have ranging capability, which may allow for degraded operation in a GPS denied environment.

Figure 6:
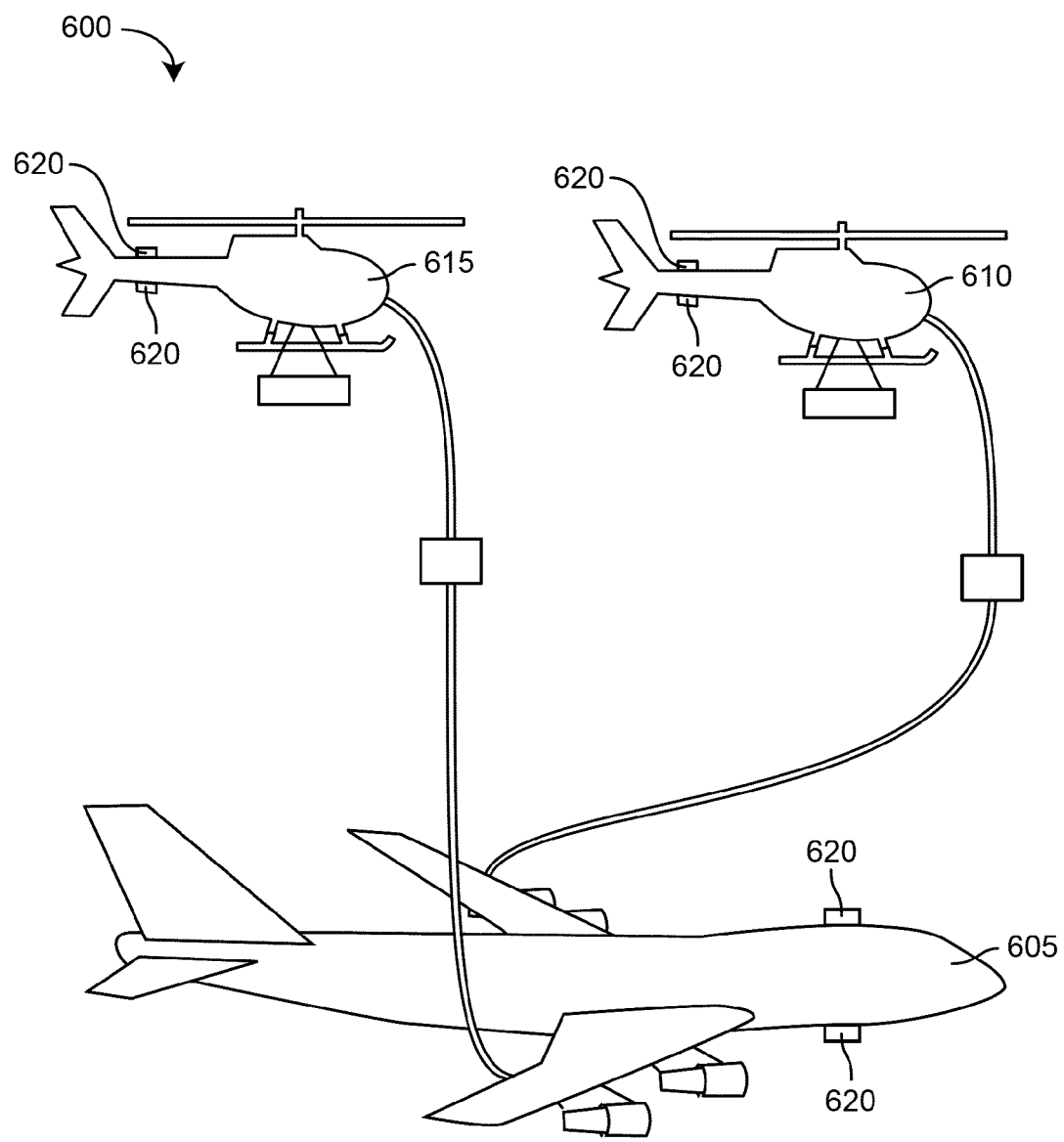
FIG. 6 is an illustration of an implementation in which an aircraft is refueled in-air by one or more other aircraft according to an exemplary embodiment.

Referring now to FIG. 6, another implementation 600 is shown in which two aircraft 610 and 615 (e.g., helicopters) are conducting a refueling operation to refuel a third aircraft 605 (e.g., a fixed wing aircraft). Each of the aircraft may be equipped with a radio 620 (e.g., data link radio 120 and/or processing circuit 125) (e.g., JPALS radio) configured to communicate position, orientation, time, and intended flight path information among the aircraft. The data may be used to generate a representation of the other aircraft involved in the refueling operation, and the pilot may use the representation to maintain the aircraft within a particular position during the refueling operation. In some embodiments, additional information regarding the position and/or orientation of the refueling equipment (e.g., boom and receptacle or probe and drogue) may be transmitted via the data transmission and may be represented within the virtual representation displayed to the pilot and/or may be used by an autonomous refueling system. This may help ensure a higher degree of safety during refueling and/or lessen the chances of an inadvertent disconnect during fuel transfer. In some embodiments, this information may be used for autonomous refueling (e.g., in an automatic mode), during inclement (e.g., IMC) weather conditions, and/or to assist a fatigued pilot.

Figure 7:
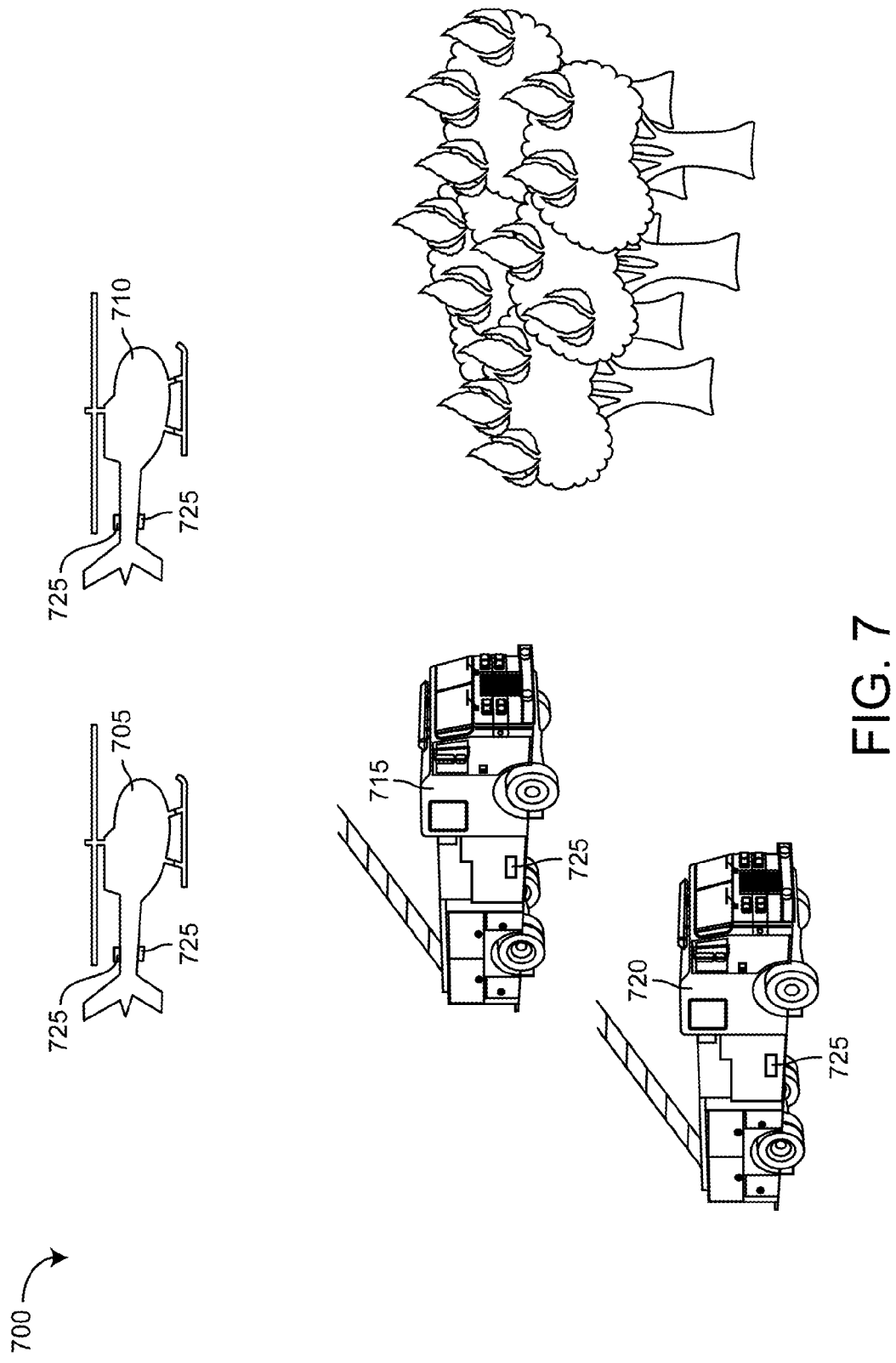
FIG. 7 is an illustration of an implementation in which several firefighting vehicles communicate with one another according to an exemplary embodiment.

Referring now to FIG. 7, yet another implementation 700 is shown in which several firefighting vehicles communicate information to one another over the data transmission to accomplish a common task of fighting a fire. Two helicopters 705 and 710 and two fire trucks 715 and 720 may share position, orientation, intended movement, and/or other information via a radio 720 (e.g., data link radio 120 and/or processing circuit 125) (e.g., JPALS radio). For firefighting applications, it is important to know where other firefighting platforms are and where they are going (e.g., both air and ground platforms). Air-to-air and air-to-ground communications and synthetic visualization of terrain and/or fire lines may aid in putting fire retardant where it is needed. Additionally, helicopters 705 and 710 may be able to aid firefighters in trucks 715 and 720, wherein previously the trucks may have been obscured by smoke and unable to determine how to navigate safely. In some embodiments, information from Automatic Dependent Surveillance-Broadcast (ADS-B) In and/or active traffic systems may be routed over the data transmission using ground and/or airborne computers to allow a platform that is not equipped with ADS-B In to "see" platforms not equipped with the data transmission method.

Figure 8:
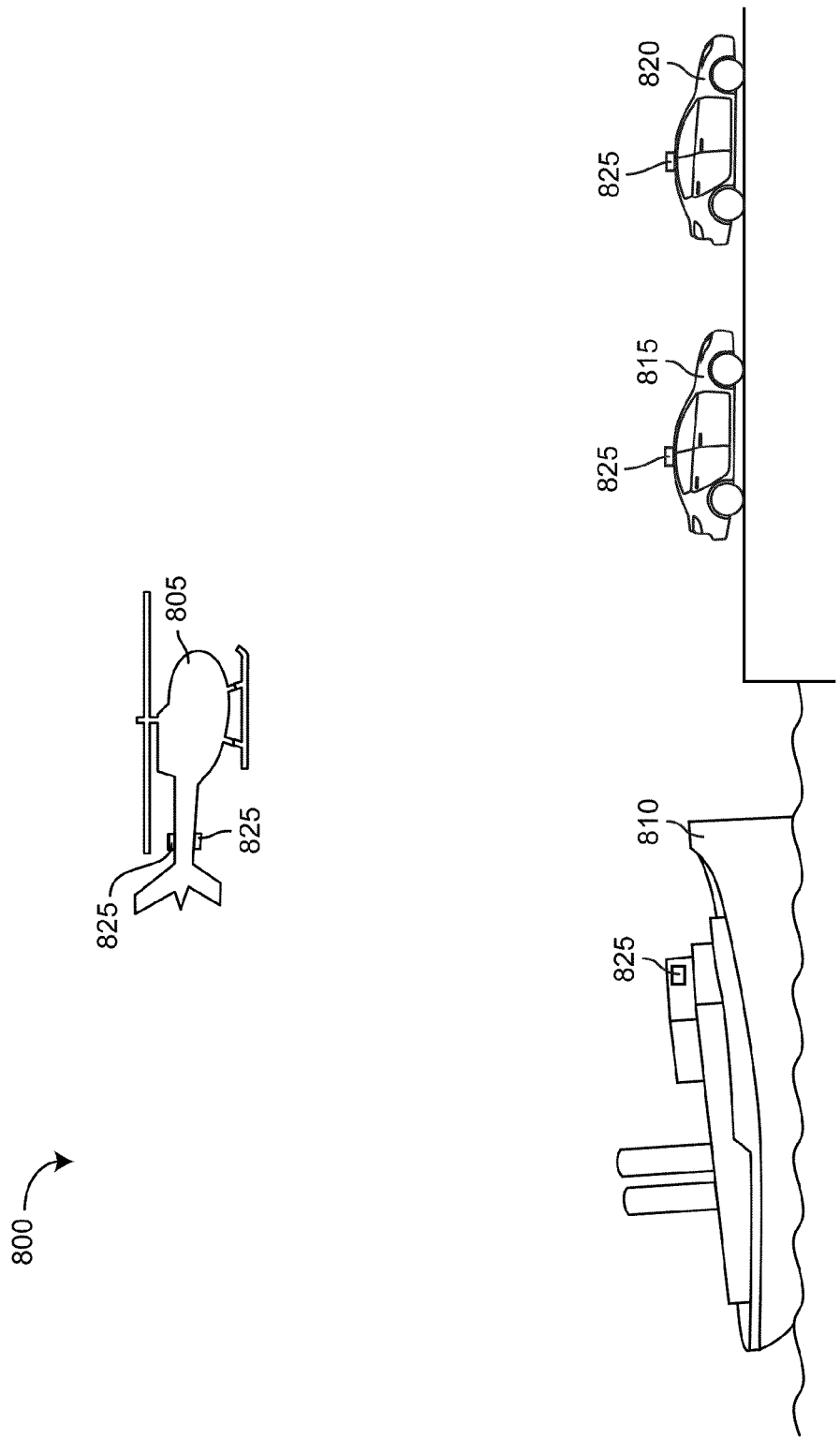
FIG. 8 is an illustration of an implementation in which several law enforcement vehicles communicate with one another according to an exemplary embodiment.

Referring now to FIG. 8, in another implementation 800, several law enforcement, national security, and/or military vehicles may communicate information to one another using the data transmission to accomplish a common task. Such vehicles may include law enforcement vehicles, military vehicles, coast guard vehicles, and/or any other types of vehicles. In the illustrated embodiment, a helicopter 805, ship 810, and two cars 815 and 820 are configured to communicate position, orientation, intended movement, and/or other information via a radio 820 (e.g., data link radio 120 and/or processing circuit 125) (e.g., JPALS radio). It may be useful to intercept and shadow a moving cooperative ground and/or water-based platform (e.g., car, truck, boat, etc.) and a vertical lift platform (e.g., helicopter) for surveillance and/or chase. The data transmission may provide a clean handoff of information between air and ground/water platforms. Use of the data transmission may preserve covertness when needed for surveillance, speed rescue for coast guard operations, and/or allow air assets to act as a handoff broker across jurisdictional lines during a chase or follow operation.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method for use in navigating a plurality of aircraft, the method comprising:
   identifying one of the plurality of aircraft as a master aircraft;
   receiving a plurality of messages from the plurality of aircraft within a plurality of time slots of a data transmission using a data link radio of each of the plurality of aircraft, wherein the time slots of the data transmission are divided by time such that each of the plurality of aircraft transmits a message within a separate time slot of the data transmission, wherein the master aircraft transmits a message within a first time slot of the plurality of time slots, wherein the message transmitted by the master aircraft is configured to resynchronize the plurality of aircraft, and wherein each message comprises position data, time data including an associated time stamp indicating the time at which data in the message was collected, aircraft orientation data, and intended flight path data for the aircraft transmitting the message, the intended flight path data comprising an energy state for the aircraft transmitting the message; wherein the energy state comprises acceleration/deceleration of airspeed with respect to desired position and throttle setting required to achieve the position; and
   generating a representation of an environment around the aircraft based on the position data, time data, aircraft orientation data, and intended flight path data comprising the energy state within the received messages, wherein the representation comprises a current position and an intended path including an indication of an energy state for one or more of the other aircraft.

2. The method of claim 1, wherein the data link radio is a bi-directional data link radio.

3. The method of claim 1, wherein the position data transmitted by at least one of the plurality of aircraft comprises both an absolute position of the aircraft and a relative position of the aircraft with respect to at least one other aircraft of the plurality of aircraft.

4. The method of claim 1, wherein the representation further comprises a current orientation for the one or more of the other aircraft.

5. The method of claim 1, further comprising transmitting the representation to a display device for display to a pilot of the aircraft.

6. The method of claim 5, wherein the display device comprises one of a helmet mounted display, a heads up display, or a heads down display.

7. The method of claim 6, wherein the display device comprises a helmet mounted display, and wherein the helmet mounted display is configured to display a view of the environment relative to motion of a head of the pilot in response to receiving the representation.

8. The method of claim 1, further comprising transmitting from the master aircraft one or more messages using unused time slots within the data transmission, the one or more messages including at least one of weather hazards or terrain hazards within proximity of a flight path of one or more of the plurality of aircraft.

9. The method of claim 1, further comprising transmitting at least one of the data transmission and the representation to a remote computing device configured to allow a pilot to navigate one or more of the plurality of aircraft from a remote location.

10. The method of claim 1, wherein the plurality of aircraft comprise one or more unmanned aircraft, wherein the one or more unmanned aircraft are configured to navigate based at least in part on a three-dimensional database stored in a memory of the unmanned aircraft, and wherein each of the one or more unmanned aircraft is configured to update information in the three-dimensional database based on the messages within the data transmission.

11. The method of claim 1, wherein the plurality of aircraft comprise a plurality of rotary wing aircraft, and wherein each of the plurality of rotary wing aircraft is configured to utilize the representation to maintain a safe distance from others of the plurality of rotary wing aircraft.

12. The method of claim 1, wherein each of the plurality of aircraft is configured to utilize the representation to navigate the aircraft within an approximate formation position of a predetermined position with respect to others of the plurality of aircraft.

13. The method of claim 1, wherein the plurality of aircraft are configured to utilize the representation to navigate during an in-air refueling of one or more of the plurality of aircraft.

14. The method of claim 13, wherein transmitting the plurality of messages within the plurality of time slots of the data transmission comprises transmitting one or more messages including position data for refueling equipment, wherein the refueling equipment comprises a boom and a receptacle or a probe and a drogue, and wherein generating the representation of the environment around the aircraft comprises generating a representation of a current position of the refueling equipment based on the position data for the refueling equipment obtained from the data transmission.

15. A system for use in navigating an aircraft, the system comprising:
a data link radio; and
an electronic processor configured to:
transmit a message within one of a plurality of time slots of a data transmission using the data link radio, wherein the aircraft is one of a plurality of aircraft, wherein other aircraft of the plurality of aircraft are configured to transmit messages in other time slots of the plurality of time slots of the data transmission, wherein the time slots of the data transmission are divided by time such that each of the plurality of aircraft transmits a message within a separate time slot of the data transmission, wherein a master aircraft of the plurality of aircraft transmits a message within a first time slot of the plurality of time slots, wherein the message transmitted by the master aircraft is configured to resynchronize the plurality of aircraft, and wherein each message comprises position data, time data including an associated time stamp indicating the time at which data in the message was collected, aircraft orientation data, and intended flight path data for the aircraft transmitting the message, the intended flight path data comprising an energy state for the aircraft transmitting the message, wherein the energy state comprises acceleration/deceleration of airspeed with respect to desired position and throttle setting required to achieve the position;
receive a plurality of received messages transmitted by the other aircraft of the plurality of aircraft within the data transmission; and
generate a representation of an environment around the aircraft based on the position data, time data, aircraft orientation data, and intended flight path data comprising the energy state within the received messages, wherein the representation comprises a current position and an intended path including an indication of an energy state for one or more of the other aircraft.

16. The system of claim 15, wherein the data link radio is a bi-directional data link radio.

17. The system of claim 15, wherein the intended flight path data comprises at least one of a velocity vector and a flight path marker.

18. The system of claim 15, wherein the electronic processor is further configured to transmit the representation to a display device for display to a pilot of the aircraft, wherein the display device comprises one of a helmet mounted display, a heads up display, or a heads down display.

19. The system of claim 15, wherein the electronic processor is further configured to transmit from the master aircraft one or more messages using unused time slots within the data transmission, the one or more messages including at least one of weather hazards or terrain hazards within proximity of the aircraft.

20. The system of claim 15, wherein the electronic processor is further configured to transmit at least one of the data transmission and the representation to a remote computing device configured to allow a pilot to navigate the aircraft from a remote location.

21. The system of claim 15, wherein the aircraft is an unmanned aircraft, wherein the unmanned aircraft is configured to navigate based at least in part on a three-dimensional database stored in a memory of the unmanned aircraft, and wherein the unmanned aircraft is configured to update information in the three-dimensional database based on the messages within the data transmission.

22. The system of claim 15, wherein the plurality of aircraft comprise a plurality of rotary wing aircraft, and wherein the representation generated by the electronic processor is configured to assist a pilot in maintaining a safe distance from others of the plurality of rotary wing aircraft.

23. The system of claim 15, wherein the representation generated by the electronic processor is configured to assist a pilot in navigating the aircraft within an approximate formation position of a predetermined position with respect to others of the plurality of aircraft.

24. The system of claim 15, wherein the representation generated by the electronic processor is configured to assist a pilot in navigating the aircraft during an in-air refueling of one or more of the plurality of aircraft.

25. The system of claim 24, wherein the plurality of messages transmitted within the plurality of time slots of the data transmission comprises one or more messages including position data for refueling equipment, wherein the refueling equipment comprises a boom and a receptacle or a probe and a drogue, and wherein the electronic processor is configured to generate the representation to include a current position of the refueling equipment based on the position data for the refueling equipment obtained from the data transmission.

26. One or more computer-readable storage media having instructions stored thereon, the instructions being executable by one or more processors of an aircraft to:
- transmit a message within one of a plurality of time slots of a data transmission using a data link radio, wherein the aircraft is one of a plurality of aircraft, wherein other aircraft of the plurality of aircraft are configured to transmit messages in other time slots of the plurality of time slots of the data transmission, wherein the time slots of the data transmission are divided by time such that each of the plurality of aircraft transmits a message within a separate time slot of the data transmission, wherein a master aircraft of the plurality of aircraft transmits a message within a first time slot of the plurality of time slots, wherein the message transmitted by the master aircraft is configured to resynchronize the plurality of aircraft, and wherein each message comprises position data, time data including an associated time stamp indicating the time at which data in the message was collected, aircraft orientation data, and intended flight path data comprising an energy state for the aircraft transmitting the message, wherein the energy state comprises acceleration/deceleration of airspeed with respect to desired position and throttle setting required to achieve the position;
- receive a plurality of received messages transmitted by the other aircraft of the plurality of aircraft within the data transmission; and
- generate a representation of an environment around the aircraft based on the position data, time data, aircraft orientation data, and intended flight path data comprising an energy state within the received messages, wherein the representation comprises a current position and an intended path for one or more of the other aircraft.

27. The one or more computer-readable storage media of claim 26, wherein the data link radio is a bi-directional data link radio.

28. The one or more computer-readable storage media of claim 26, wherein the plurality of aircraft comprise a plurality of rotary wing aircraft, and wherein the representation generated by the one or more processors is configured to assist a pilot in maintaining a safe distance from others of the plurality of rotary wing aircraft.

29. The one or more computer-readable storage media of claim 26, wherein the representation generated by the one or more processors is configured to assist a pilot in navigating the aircraft within an approximate formation position of a predetermined position with respect to others of the plurality of aircraft.

30. The one or more computer-readable storage media of claim 26, wherein the representation generated by the one or more processors is configured to assist a pilot in navigating the aircraft during an in-air refueling of one or more of the plurality of aircraft.

31. The one or more computer-readable storage media of claim 26, wherein the plurality of messages transmitted within the plurality of time slots of the data transmission comprises one or more messages including position data for refueling equipment, wherein the refueling equipment comprises a boom and a receptacle or a probe and a drogue, and wherein the one or more processors are configured to generate the representation to include a current position of the refueling equipment based on the position data for the refueling equipment obtained from the data transmission.

* * * * *